United States Patent
Wendte et al.

(10) Patent No.: US 9,648,802 B2
(45) Date of Patent: *May 16, 2017

(54) MULTIPLE SEED-TYPE PLANTER WITH ON-ROW SELECTOR ASSEMBLY

(71) Applicant: CNH Industrial America LLC, New Holland, PA (US)

(72) Inventors: Keith W. Wendte, Willowbrook, IL (US); Chad M. Johnson, Arlington Heights, IL (US); Scott A. Long, Plainfield, IL (US); Brian T. Adams, Centralia, MO (US); Marvin A. Prickel, Homer Glen, IL (US); Jason T. Czapka, Munster, IN (US); Brian T. Anderson, Yorkville, IL (US); Michael J. Connors, Lockport, IL (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/554,552

(22) Filed: Nov. 26, 2014

(65) Prior Publication Data

US 2016/0143212 A1    May 26, 2016

(51) Int. Cl.
*A01C 7/04*    (2006.01)
*A01C 7/16*    (2006.01)
(Continued)

(52) U.S. Cl.
CPC ............ *A01C 21/005* (2013.01); *A01C 7/046* (2013.01); *A01C 7/082* (2013.01); *A01C 15/006* (2013.01)

(58) Field of Classification Search
CPC ............ A01C 7/00; A01C 7/16; A01C 21/005
See application file for complete search history.

(56) References Cited

U.S. PATENT DOCUMENTS 5,170,730 A    12/1992    Swallow
5,402,741 A    4/1995    Truax et al.
(Continued)

OTHER PUBLICATIONS http://ravenprecision.com/assets/users/general/OMNIROW_WHITEPAPER.pdf; Raven brochure; Multi-hybrid and variable rate planting solution; 2013.
(Continued)

*Primary Examiner* — John G Weiss
(74) *Attorney, Agent, or Firm* — Rebecca L. Henkel; Rickard K. DeMille

(57) ABSTRACT

A system is provided for planting multiple types of seed and automatically switching between the varieties during planting in a single planting pass of a planting session of row-crop planting an agricultural field. The system may include a selector assembly arranged between a multi-compartment on-row hopper and a seed meter at each row unit of a planter. A control system controls selector valves of the selector assembly to switch from releasing of seeds of a first type from the on-row hopper the seed meter to releasing of seeds of a second type from the on-row hopper to the seed meter for providing a switchover of seeds being planted from the seed meter, from the first to the second type when the seed meter cross a boundary between different zones of the agricultural field.

18 Claims, 7 Drawing Sheets

(51) Int. Cl.
    *A01C 21/00*    (2006.01)
    *A01C 7/08*    (2006.01)
    *A01C 15/00*    (2006.01)

(56) References Cited

U.S. PATENT DOCUMENTS

| | | | |
|---|---|---|---|
| 5,915,313 A * | 6/1999 | Bender | A01B 79/005 111/178 |
| 6,070,539 A * | 6/2000 | Flamme | A01B 79/005 111/177 |
| 6,193,175 B1 * | 2/2001 | Andersson | A01C 21/005 222/608 |
| 6,516,733 B1 | 2/2003 | Sauder et al. | |
| 6,672,228 B1 * | 1/2004 | Groelz | A01C 7/102 111/177 |
| 6,692,228 B2 | 2/2004 | Turnquist et al. | |
| 7,140,310 B2 | 11/2006 | Mayerle et al. | |
| 7,775,167 B2 | 8/2010 | Stehling et al. | |
| 7,938,075 B1 * | 5/2011 | Glendenning | A01C 7/046 111/185 |
| 8,543,238 B2 | 9/2013 | Straeter | |
| 8,942,894 B2 | 1/2015 | Garner et al. | |
| 8,948,980 B2 * | 2/2015 | Garner | A01C 7/08 111/185 |
| 9,148,990 B2 * | 10/2015 | Redman | A01C 7/20 |
| 9,420,739 B2 * | 8/2016 | Rollenhagen | A01C 15/006 |
| 2005/0103244 A1 * | 5/2005 | Mayerle | A01C 7/06 111/175 |
| 2011/0054743 A1 | 3/2011 | Kocer et al. | |
| 2013/0192503 A1 * | 8/2013 | Henry | A01C 7/082 111/174 |
| 2014/0165890 A1 | 6/2014 | Graham | |
| 2014/0174330 A1 | 6/2014 | Garner et al. | |
| 2014/0277959 A1 * | 9/2014 | Wagers | A01C 21/005 701/50 |
| 2015/0059629 A1 * | 3/2015 | Kinzenbaw | A01C 7/044 111/200 |
| 2015/0059630 A1 * | 3/2015 | Kinzenbaw | A01C 7/044 111/200 |
| 2015/0223391 A1 * | 8/2015 | Wendte | A01C 7/04 111/177 |

OTHER PUBLICATIONS https://web.archive.org/web/20130618044259/http://ravenprecision.com/products/planter-controls; waybackmachine archive of website with OmniRow multi-hybrid control; 2013.
https://www.youtube.com/watch?v=TgGJtBxqGLE; OmniRow® Multi-Hybrid Planter Controls; 2013.

* cited by examiner

MULTIPLE SEED-TYPE PLANTER WITH ON-ROW SELECTOR ASSEMBLY

FIELD OF THE INVENTION

The invention relates generally to planters or seeders and, in particular, to planters and seeders for planting multiple types or varieties of seed.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. However, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit.

SUMMARY OF THE INVENTION

The present invention is directed to systems for row crop planting that allow for planting multiple types of seed which may include planting at varying rates in a single planting pass. The system may allow for on-the-go switching of type(s) of seed being planted from a single seed meter at each row unit of the planter. This can be achieved by an on-row hopper with multiple compartments storing multiple types of seed at each row unit and a selector assembly at each row unit that is controlled to selectively release one of the types of seeds from the on-row hopper into the seed meter based on a zone of the agricultural field being planted. When the planter approaches a boundary between first and second zones of the field, a selector valve(s) of the selector assembly actuates to stop delivering a first seed type from the hopper to the seed meter and start delivering a second seed type from the hopper to seed meter. This allows for planting multiple types of seed with a single seed meter at each row unit in a single planting pass without having to add additional row units or seed meters.

According to one aspect of the invention, actuating the selector valve(s) is synchronized with respect to movement of the planter to allow the seeds of the second seed type to be released from the planter when the planter crosses the boundary from the first to the second zone. In one embodiment, stopping and starting release the first and second seed types is done substantially simultaneously, allowing for a transitional mixed seed planting phase during which a mixture of the first and second seeds may be released from the planter. In another embodiment, release of seeds in the first seed type is stopped, and release of the seeds of the second seed type is delayed until substantially all of the first seed type has been released from the planter, allowing for a substantial discrete switchover from planting the first seed type to planting the second seed type, minimizing mixing.

According to another aspect of the invention, a planter is provided for planting multiple types of seed in a single planting pass during row-crop planting of an agricultural field. The planter includes a frame and multiple row units supported by the frame. Each of the multiple row units includes an on-row storage system with multiple compartments configured to store the multiple types of seed. Each row unit has a seed meter for planting the multiple types of seed. Each seed meter includes a housing defining a seed chamber therein for receiving seeds for singulation and individual delivery from the seed meter. The housing of the seed meter has an inlet defining a passage from outside of the seed meter to the seed chamber. Each row unit has a selector assembly arranged between the multiple compartments of the on-row storage system and the inlet of the seed meter housing. The selector assembly selectively releases seeds of one of the multiple types of seed from a corresponding one of the multiple compartments of the on-row storage system into the seed chamber of the seed meter at a given time.

According to another aspect of the invention, the multiple compartments of the on-row storage system include compartment outlets, and the selector assembly includes an inlet segment arranged for receiving seeds from the compartment outlets. The selector assembly may include at least one selector valve actuatable for selectively blocking flow of seeds through ones of the compartment outlets and permitting flow of seeds through ones of the compartment outlets to switch which of the multiple seed types is delivered to the seed chamber of the seed meter. The selector assembly may include a valve system selectively blocking flow and permitting flow of seeds of the multiple types through the selector assembly for allowing delivery of seeds of a single one of the multiple types out of the selector assembly at a given time. The selector assembly may include at least one selector valve configured to unblock and permit flow of seeds through a single one of the compartment outlets of the on-row storage system and block, and prevent flow of seeds through the remaining compartment outlets of the on-row storage system while the selector assembly is directing seeds from the on-row storage system to the inlet of the seed meter housing.

According to another aspect of the invention, the selector valve is a linear actuated gate or a rotationally activated gate which can be driven electronically, hydraulically, pneumatically, by way of friction. The at least one selector valve can include a selector valve arranged with respect to each of the outlets of the on-row compartments. The at least one selector valve may be arranged closer to the outlets of the on-row storage system than the inlet of the seed meter housing. The selector assembly may include an outlet segment arranged between the inlet segment of the selector assembly and the inlet of the seed meter housing for directing seeds from the selector assembly to the inlet of the seed meter housing. The outlet segment of the selector assembly may include an outlet duct interconnecting the selector assembly with the inlet of the seed meter housing and defining a passage extending in a longitudinal direction relative to the outlet segment of the selector assembly for directing the seeds from the selector assembly to the inlet of the seed meter housing.

According to another aspect of the invention, the multiple compartments are defined in a hopper and the compartment outlets are defined at the bottom wall of the hopper. The inlet segment of the selector assembly is connected to the bottom wall of the hopper to receive seeds from the compartment outlets at the bottom wall. The multiple compartments are defined in a bulk storage hopper supported by the row unit, which can be manually or non-pneumatically filled such that the entire volume(s) of the seeds to be planted is stored in the bulk storage hopper. Seeds stored in the bulk storage hopper are gravity fed from the multiple compartments into the inlet of the seed meter housing. At least some of the multiple compartments are defined in a mini-hopper supported by the row unit and configured to pneumatically receive seeds of the multiple types from a bulk storage system of a planter, such as a centrally located bulk fill hopper(s).

According to another aspect of the invention, the planter has a frame and multiple row units supported by the frame. Each of the multiple row units has multiple compartments storing corresponding multiple types of seed. Each row unit has a seed meter for separately planting the multiple types of seed at separate zones of an agricultural field, wherein each of the zones corresponds to a characteristic of the agricultural field relating to at least one of soil type and management type. A selector assembly extends between the multiple compartments and the seed meter for selectively releasing a first seed type of the multiple types of seed from a corresponding first one of the multiple compartments into the seed meter for release onto a first zone of the agricultural field. The selector assembly selectively releases a second seed type of the multiple types of seed from a corresponding second one of the multiple compartments into the seed meter for release onto a second zone of the agricultural field.

According to another aspect of the invention, the multiple compartments include a bulk-receiving compartment pneumatically receiving the first seed type from a remote bulk storage system for bulk storing of the first seed type and location that is spaced from the row unit and a bulk storing compartment for bulk storing the second seed type at the row unit. Each of the bulk receiving and storing compartments has an outlet in seed flow communication with an inlet segment of the selector assembly. This can include at least one selector valve actuatable for selectively blocking flow of seeds through the outlets of the bulk-receiving and storing compartments and permitting flow of seeds through the outlets of the bulk-receiving and storing compartments to switch which of the first and second seed types is delivered to the seed meter. The seed meter includes an inlet providing a passage for seeds to flow into the seed meter and the selector assembly includes an outlet duct arranged between the at least one selector valve and the seed meter inlet. The outlet duct of the selector assembly receives seeds of the first or second type permitted to flow past the at least one selector valve and directs the seeds of the first or second type permitted to flow past at least one selector valve from the at least one selector valve to the inlet of the seed meter.

According to another aspect of the invention, the planter includes a frame supporting multiple row units, and multiple compartments are arranged at each of the multiple row units and configured to store the multiple types of seed. A seed meter at each of the multiple row units is configured for planting the multiple types of seed. Each seed meter includes a housing defining a seed chamber therein for receiving seeds for singulation and individual delivery from the seed meter. The housing of the seed meter has an inlet defining a passage for directing seed into the seed chamber. Each row unit has a selector assembly arranged between the multiple compartments and the inlet of the seed meter housing for selectively releasing seeds of one of the multiple types of seed from a corresponding one of the multiple compartments of the on-row storage system into the seed chamber of the seed meter at a given time. A control system is operably connected to each selector assembly and configured to control which seed type of the multiple seed types is released onto an agricultural field based on a location of the planter with respect to multiple zones of an agricultural field. Each of the multiple zones corresponds to a characteristic of the agricultural field relating to at least one of soil type and management type. The control system commands actuation of the selector assembly to switch from delivering seeds of a first type from a first compartment of the multiple compartments past the selector assembly and into the seed chamber of the seed meter when the planter is in a first zone of the multiple zones to delivering seeds of a second type from a second compartment of the multiple compartments past the selector assembly and into the seed chamber of the seed meter when the planter is in a second zone of the multiple zones. The switchover event can be synchronized to occur when the planter crosses a boundary between the first to the second zone.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
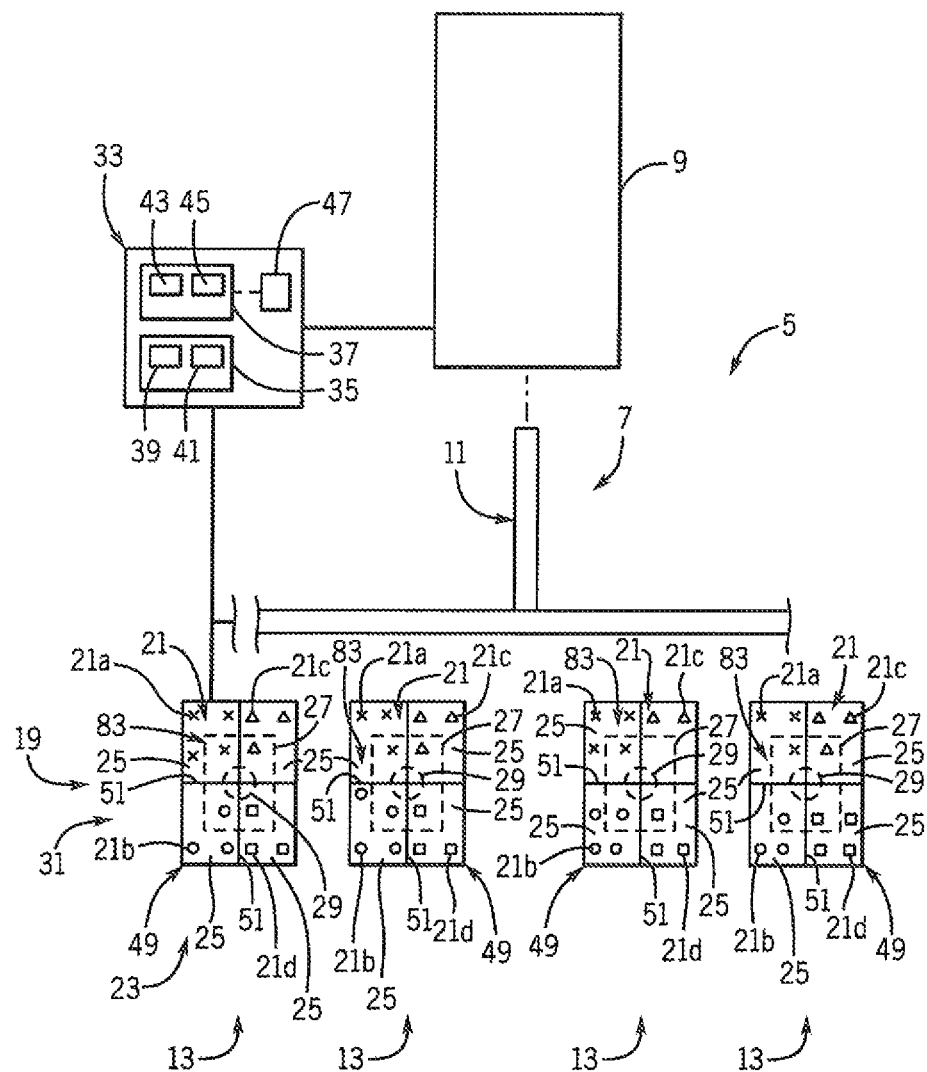
FIG. 1 is a simplified schematic representation of a planting system for planting multiple varieties of seed.
Figure 2:
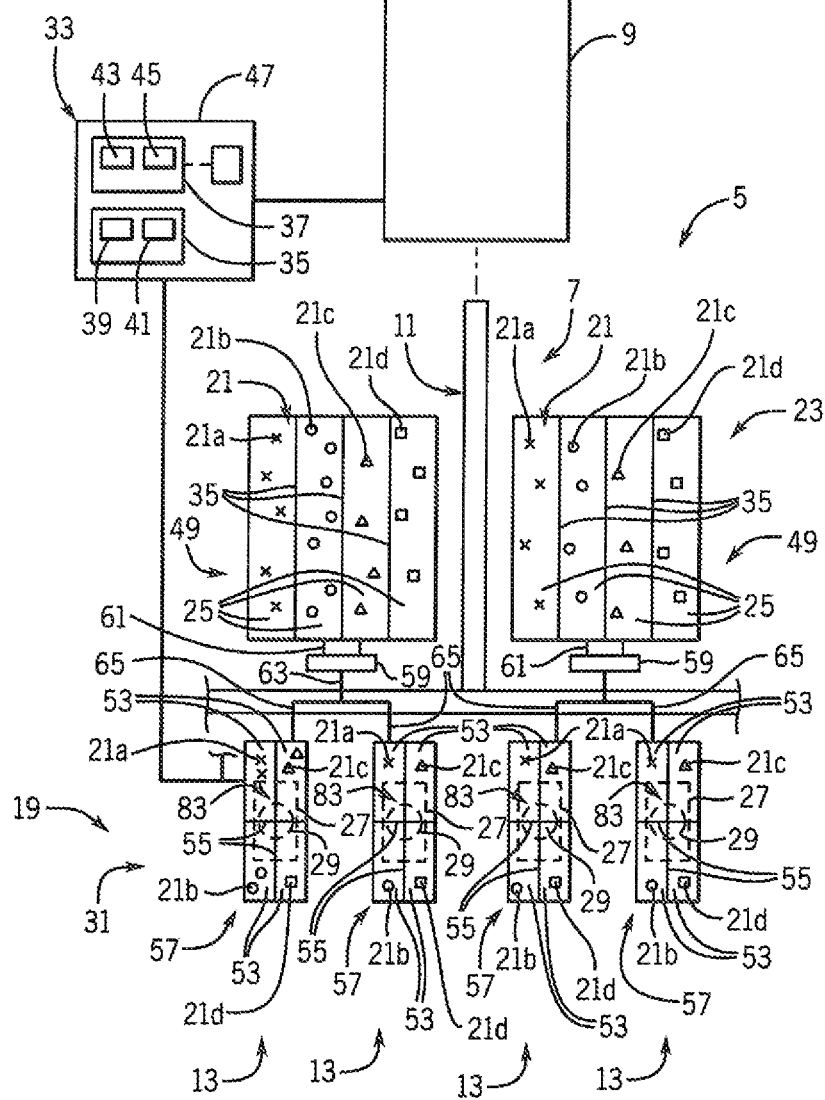
FIG. 2 is a simplified schematic representation of a variant of the system of FIG. 1.
Figure 3:
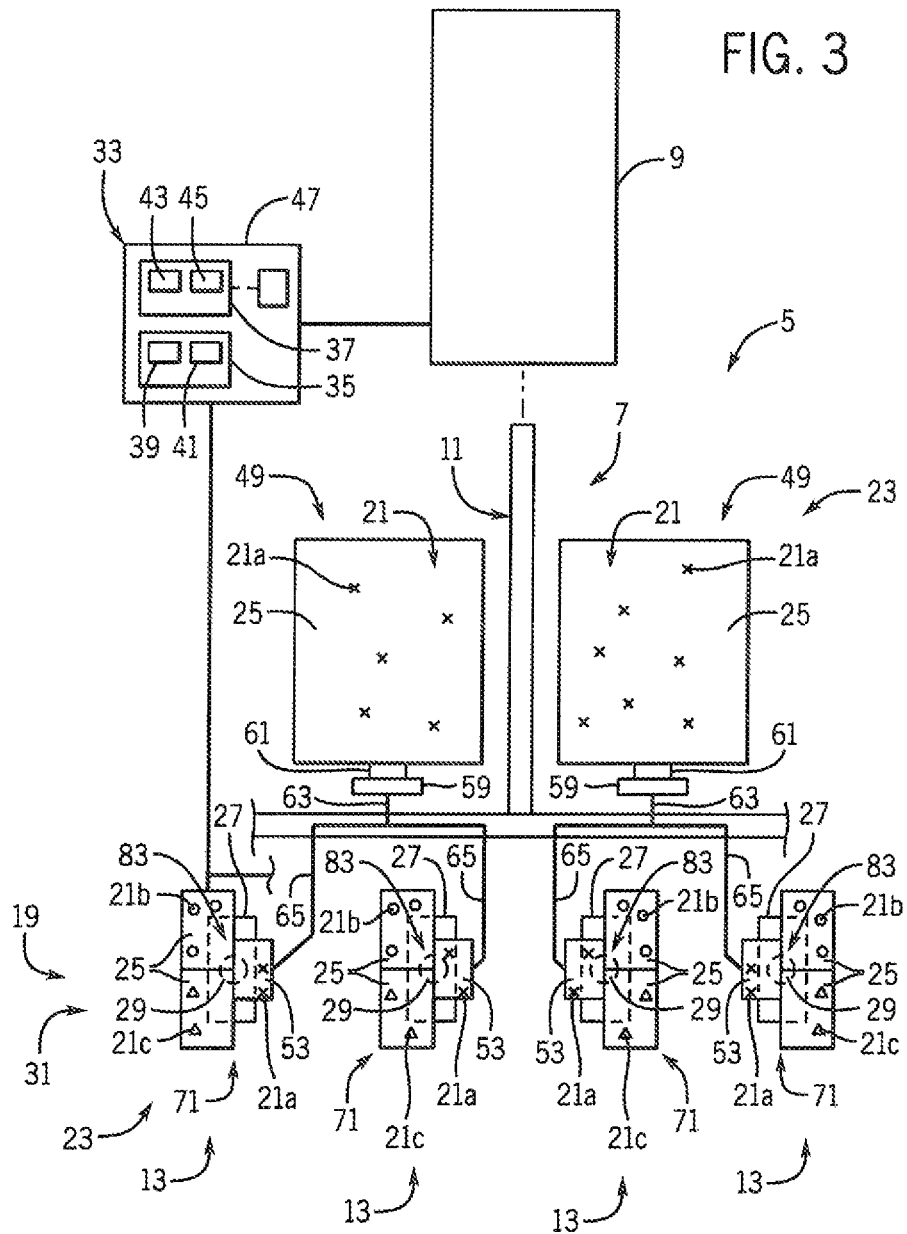
FIG. 3 is a simplified schematic representation of another variant of the system of FIG. 1.
Figure 5:
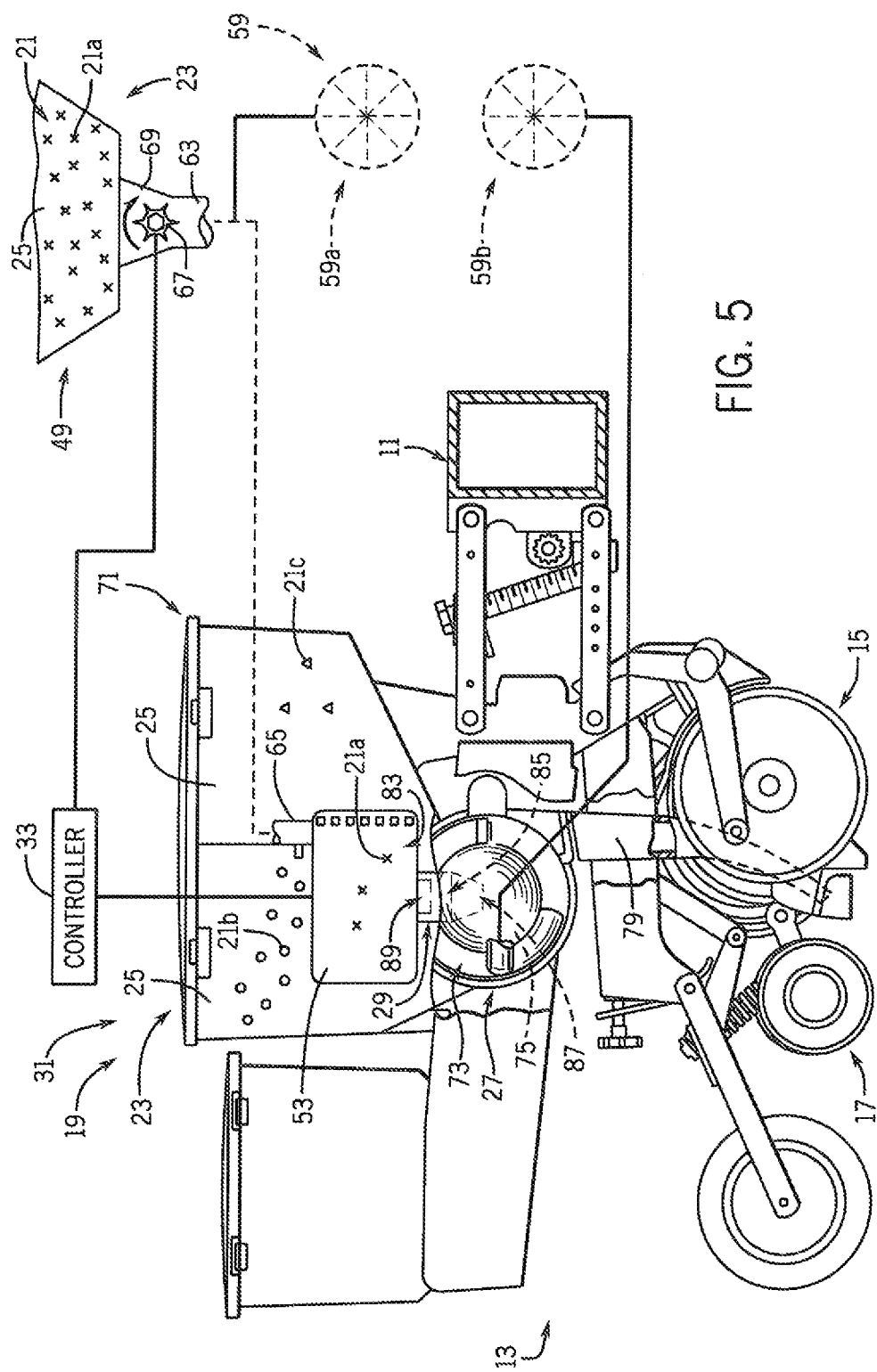
FIG. 5 is a side elevation view of a simplified schematic representation of the system of FIG. 3.

Referring now to the drawings and specifically to the simplified schematic representations of FIGS. 1-3, a system 5 is shown that allows for on-the-go switching of type(s) of seed being planted by a planter without requiring manual cleanout of seed meters or ancillary row units or seed meters. The system 5 includes a planter 7 such as one of the EARLY RISER® series planters available from Case IH towed behind a traction device such as tractor 9. The planter 7 includes a frame 11 that supports multiple row units 13 that are substantially identical. As shown in FIG. 5, each of the row units 13 has ground-engaging tools that may include opening and closing mechanisms 15, 17 such as opener disks and closing disks, respectively, or other ground-engaging tools for opening and closing a furrow. The ground-engaging tools may also include a gauge wheel configured for adjusting furrow depth by limiting soil penetration of the furrow-opening mechanism of the ground-engaging tools while creating a furrow, and a press wheel may be arranged to roll over the closed furrow to firm the soil over the seed to further close the furrow and promote favorable seed-to-soil contact.

Referring again to FIGS. 1-3, the planter 7 has a seed storage system 19 for separately storing seeds 21 of different types for planting different areas or zones of a field. The seeds 21 may be of a common plant type but different varieties or types 21a, 21b, 21c, 21d. Although the seed 21 may be described elsewhere herein as different types 21a, 21b, 21c, 21d, it is understood that the description of the different types includes different varieties. In other words, the different types 21a, 21b, 21c, 21d of seed 21 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite-resistant seed and non-plant-parasite resistant seed such as cyst-nematodes-resistant seeds and non-cyst-nematodes-resistant seeds, herbicide-tolerant seed and non-herbicide-tolerant seed, or other different products. The different seed products can further include different crop seeds such as corn and soybeans. Regardless, the planter 7 is configured to plant the different types 21a, 21b, 21c, 21d of seed 21 in different type or variety zones, shown as zones VZ1, VZ2, VZ3, VZ4 in the prescriptions map PM of FIG. 7. The different type or variety zones VZ1, VZ2, VZ3, VZ4 of the agricultural field are defined at least in part by characteristics relating to at least one of soil type and management type.

Figure 7:
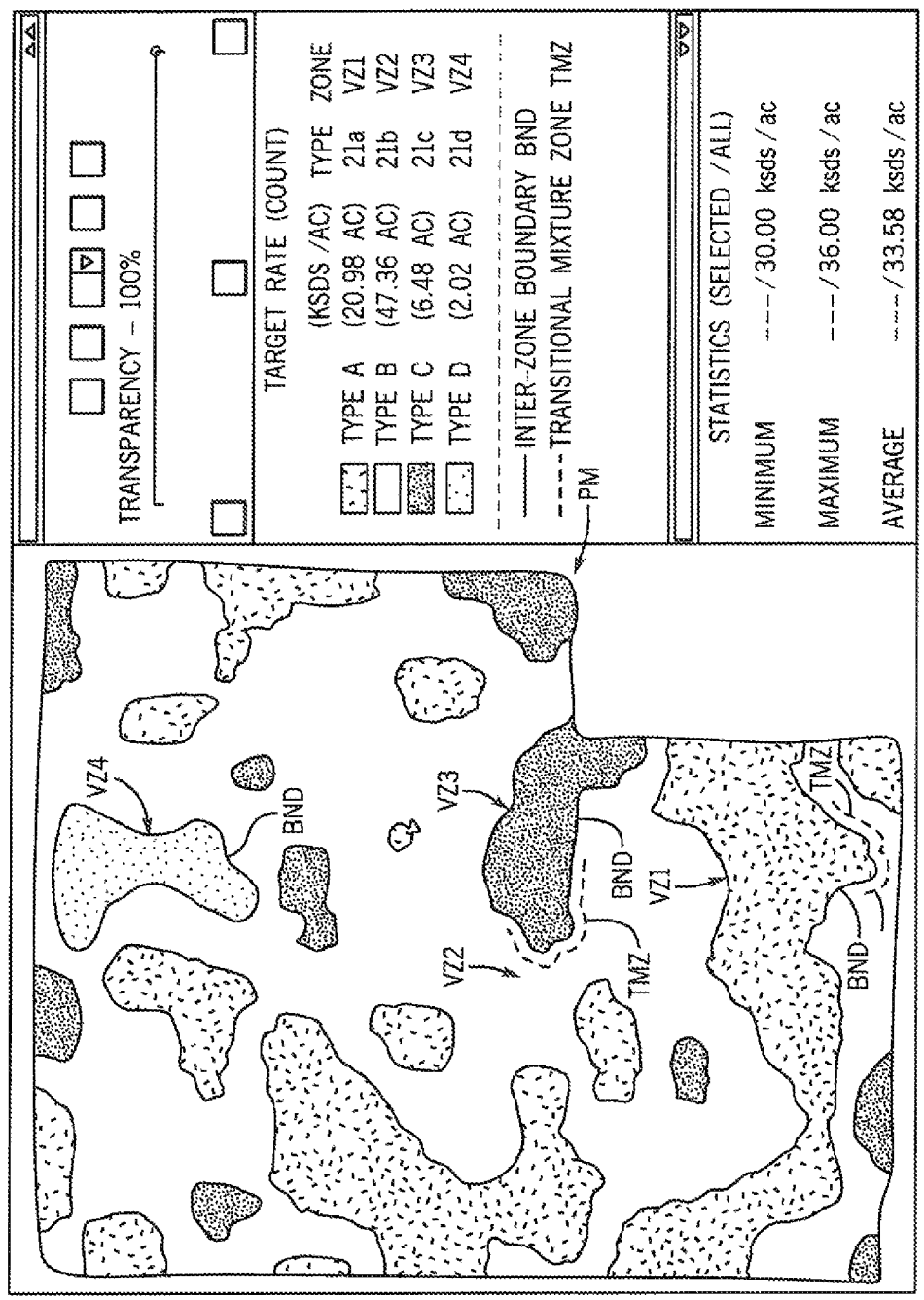
FIG. 7 is a seed variety prescription map for use with the planting system of FIG. 1.

Referring again to FIGS. 1-3, the seed storage system 19 includes a bulk storage system 23 and defines bulk fill compartments shown as hulk-storing compartments 25 storing the seed types 21a, 21b, 21c, 21d in bulk for selective delivery to seed meters 27 at the row units 13 by way of a selector assembly 29 at each row unit 13, as explained in greater detail elsewhere herein. The seed storage system 19 also includes an on-row storage system 31 for storing the seed types 21a, 21b, 21c, 21d at each of the row units 13. This arrangement allows for selective release of one of the seed types 21a, 21b, 21c, 21d by rapidly switching which of the seed types 21a, 21b, 21c, 21d are released from the selector assemblies 29 into the seed meters 27 at the row units 13 for planting at zones VZ1, VZ2, VZ3. VZ4 (FIG. 7), as controlled by a control system 33. Control system 33 includes a planter controller 35 and a tractor controller 37 that operably communicate with each other, for example, by way of an ISOBUS connection, for coordinating controls of planter 9 such as the seed meters 27 and selector assemblies 29 and tractor 9 (FIG. 1) based on the type or variety zones VZ1, VZ2, VZ3, VZ4 of the agricultural field, which may correspond to a seed type or variety prescription map PM as shown in FIG. 7. The planter controller 35 is shown including a controller 39 and a power supply 41. The controller 39 of the planter controller 35 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meters 27, selector assemblies 29, and other components of the planter 7. The tractor controller 37 is configured for controlling operations of the tractor 9 such as controlling steering, speed, braking, shifting, and other operations of the tractor 9. The tractor controller 37 is shown as including a controller 43 and power supply 45. The tractor controller 37 is configured for controlling the functions of the tractor 9 by controlling the various GPS steering, transmission, engine, hydraulic, and/or other systems of the tractor 9. Like the controller 39 of the planter controller 35, the controller 43 of the tractor controller 37 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 9. A tractor interface system 47 is operably connected to the tractor controller 37 and includes a monitor and various input devices to allow an operator to see the statuses and control various operations of the tractor 9 from within the cab of the tractor 9. The tractor interface system 47 may be a MultiControl Armrest™ console available for use with the Maxxum™ or Magnum™ series tractors from Case IH.

Referring now to FIG. 1, in this embodiment, the hulk storage system 23 is defined entirely at the on-row storage system 31 such that the entire volumes of all of the seed types 21a, 21b, 21c, 21d are stored at the row units 13, with all of the bulk-storing compartments 25 arranged within the on-row storage system 31. The bulk-storing compartments 25 in this embodiment are in a bulk fill hopper shown as a single bulk on-row hopper 49, separated from each other by divider walls or partitions 51 at each row unit 13.

Figure 4:
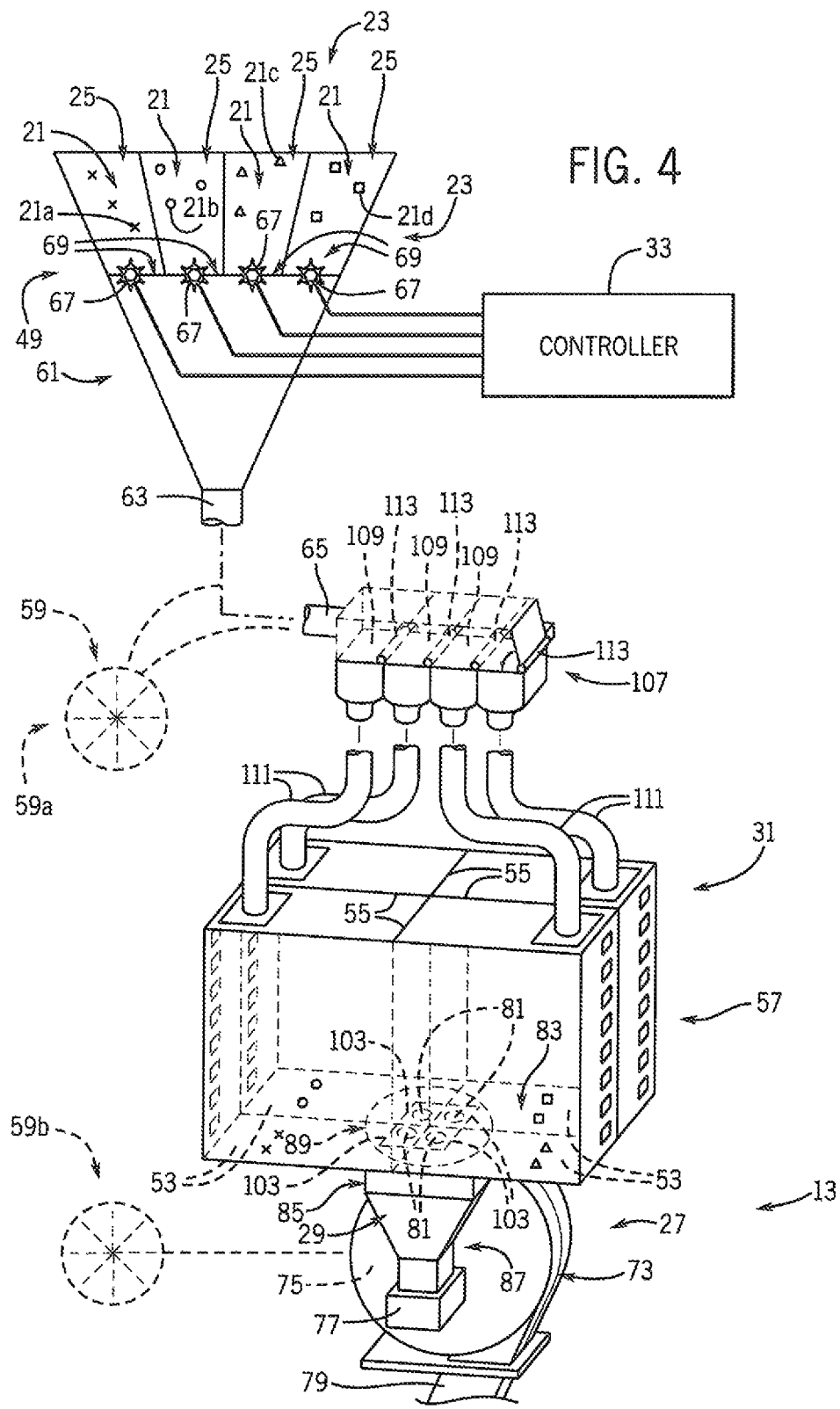
FIG. 4 is a side elevation view of a simplified schematic representation of the system of FIG. 2.

Whereas the compartments 25 defined in a single bulk on-row hopper 49 at each row unit 13 in FIG. 1, referring now to FIGS. 2 and 4, in this embodiment, the bulk storage system 23 is defined entirely at a bulk fill hopper(s) shown as centrally located bulk fill hoppers 49, with none of the bulk-storing compartments 25 arranged within the on-row storage system 31. Instead, in this embodiment, on-row storage system 31 has only bulk-receiving compartments 53 that pneumatically receive the seed types 21a, 21b, 21c, 21d from the bulk-storing compartments 25 of the centrally located bulk fill hoppers 49. The bulk-receiving compartments 53 in this embodiment are separated from each other by partitions divider walls or partitions 55 in a single segmented on-row hopper, shown as mini-hopper 57, at each row unit 13. Pneumatic delivery of the seed types 21a, 21b, 21c, 21d from the bulk-storing compartments 25 of the centrally located bulk fill hoppers 23 to the bulk-receiving compartments 53 of the on-row storage system 31 is done by way of an airflow system 59 and a cooperating primary delivery system 61. Airflow system 59 provides pneumatic power for use by various planter 7 components, including the seed meters 27, as well as transporting seeds 21 from the bulk storage system 23 to the on-row storage system 31. Airflow system 59 includes a positive air pressure source and may include a vacuum source for establishing positive and vacuum pressures and corresponding air flows. The positive air pressure source and vacuum sources can be known pumps, fans, blowers, and/or other known airflow system components. As shown in FIGS. 4 and 5, in embodiments in which the airflow system 59 provides both pneumatic power to convey seeds 21 from the bulk storage system 23 to the on-row storage system 31 and for operation of the seed meter 27, the airflow system 59 includes a seed conveyance airflow system 59a and a seed meter airflow system 59b. The seed conveyance airflow system 59a provided an airflow that entrains seeds 21 to move the bulk storage system 23 to the on-row storage system 31. The seed meter airflow system 59b provides native and/or positive pressure for operation of seed meters at the row units 13. The primary delivery system 61 releases or delivers seeds 21, such as by calibrated metering, from bulk storage in the centrally located bulk fill hoppers 57 into a seed delivery system for conveyance to the bulk-receiving compartments 53 in the mini-hoppers 57. The primary delivery system 61 delivers seeds to be entrained in an airflow(s) through primary lines or primary seed conduits 63 that connect to secondary lines or secondary seed conduits 65 that extend to the row units 13. Referring now to FIG. 4, within the primary delivery system 61, each bulk-storing compartment 25 has its seed 21 contents metered out by a metering roller(s) 67 which may be a calibrated fluted roller arranged at each outlet 69 of each bulk-storing compartment 25, or the bulk fill hopper(s) itself. The rollers 67 are driven to rotate by electronic, pneumatic, or hydraulic motors (not shown) as controlled by the control system 33, explained in greater detail elsewhere herein.

Referring now to FIGS. 3 and 5, in this embodiment, three types of seed 21 as seed types 21a, 21b, 21c are shown with planter 7. The bulk storage system 23 is defined both within the on-row storage system 31 and locations spaced from the on-row storage system 31. Bulk-storing compartments 25 are provided in the centrally located bulk fill hoppers 49 and also within combined on-row hoppers 71. The combined on-row hoppers 71 have both on-row bulk storage and mini-hopper portions with bulk-storing compartments 25 and bulk-receiving compartments 53, respectively. A primary seed type that will be planted with the highest volume in the field, shown as seed type 21a, is stored in the bulk-storing compartment(s) 25, defining primary bulk-storing compartments 25 of the centrally located bulk fill hoppers 49 of a primary bulk-storage system for pneumatic conveyance to the bulk-receiving compartment 53 at the mini hopper portion of the combined on-row hopper 71. Secondary seed types that will be planted with relatively lower volumes in the field, shown as seed types 21b, 21c, are stored in the on-row bulk storing compartment(s) 25, defining secondary bulk-storing compartments 25 of a secondary bulk-storage system at the on-row bulk storage portion of the combined on-row hopper 71.

Referring again to FIGS. 1-3, regardless of where the seed types 21a, 21b, 21c, 21d are stored in bulk on the planter 7, the seed types 21a, 21b, 21c, 21d at the on-row storage system 31 are selectively released by the selector assembly 29 at each row unit 13 to the corresponding seed meter 27. Each seed meter 27 can be a purely mechanical-type seed meter 27, an electrical seed meter 27, or a pneumatic seed meter 27. Referring now to FIGS. 4 and 5, the seed meter 27 has a housing 73 which may be a multi-component housing with interconnected cover segments enclosing an interior cavity in which an internal seed disk is rotated by a seed disk drive system. The seed disk drive system rotates at least a surface of the seed disk through a seed pool of collected seeds 21 in a seed chamber 75 within the interior cavity of the seed meter 27. Referring now to FIG. 4, the seed chamber 75 receives seeds from an inlet 77 of the seed meter housing 73 that defines a passage from outside of the seed meter 27 to the seed chamber 75. Referring again to FIGS. 4 and 5, rotating the seed disk in the interior cavity of the inside of the seed meter 27 allows the seed disk to pick up and singulate seeds from the internal seed pool and convey the individual seeds through the seed meter 27 for individual release out of the seed meter 27 through a seed tube 79. Pneumatic seed meters 27 are further operably connected to the airflow system 59 to provide a vacuum chamber within the seed meter 27 opposite the seed chamber 75 allowing the seeds from the seed pool to be held against the seed disk by vacuum pressure for moving the seeds 21 through the seed meter 27 for singulation in the seed meter 27 and delivery through the seed tube 79 onto the field.

Regardless of the particular configuration of the seed meter 27, the selector assembly 29 defines a seed flow directing conduit arrangement that selectively guides the seed types 21a, 21b, 21c, 21d, for example, one at a time or as a mixture, from the on-row storage system 31 to the seed meter 27. The selector assembly 29 is configured to selectively block flow and permit flow of seeds 21 of the multiple seed type(s) 21a, 21b, 21c, 21d through the selector assembly 29 for allowing delivery of seeds of a single one(s) of the multiple types seed type(s) 21a, 21b, 21c, 21d out of the selector assembly at a given time as controlled by the control system 33. Referring now to FIG. 4, the selector assembly 29 receives the seeds types 21a, 21b, 21c, 21d from compartment outlets 81 that include openings extending through a bottom wall 83 of each of the on-row hoppers 49 (FIG. 1), 57 (FIG. 2), 71 (FIG. 3). Referring now to FIGS. 4 and 5, the selector assembly 29 has a body with an inlet segment 85 and an outlet segment 87 that collectively extend between the on-row hoppers 49 (FIG. 1), 57 (FIG. 2), 71 (FIG. 3) and the respective seed meter 27 and a valve system 89 for selectively guiding the seed type(s) 21a, 21b, 21c, 21d through the selector assembly 29 to the seed meter 27.

Figure 6:
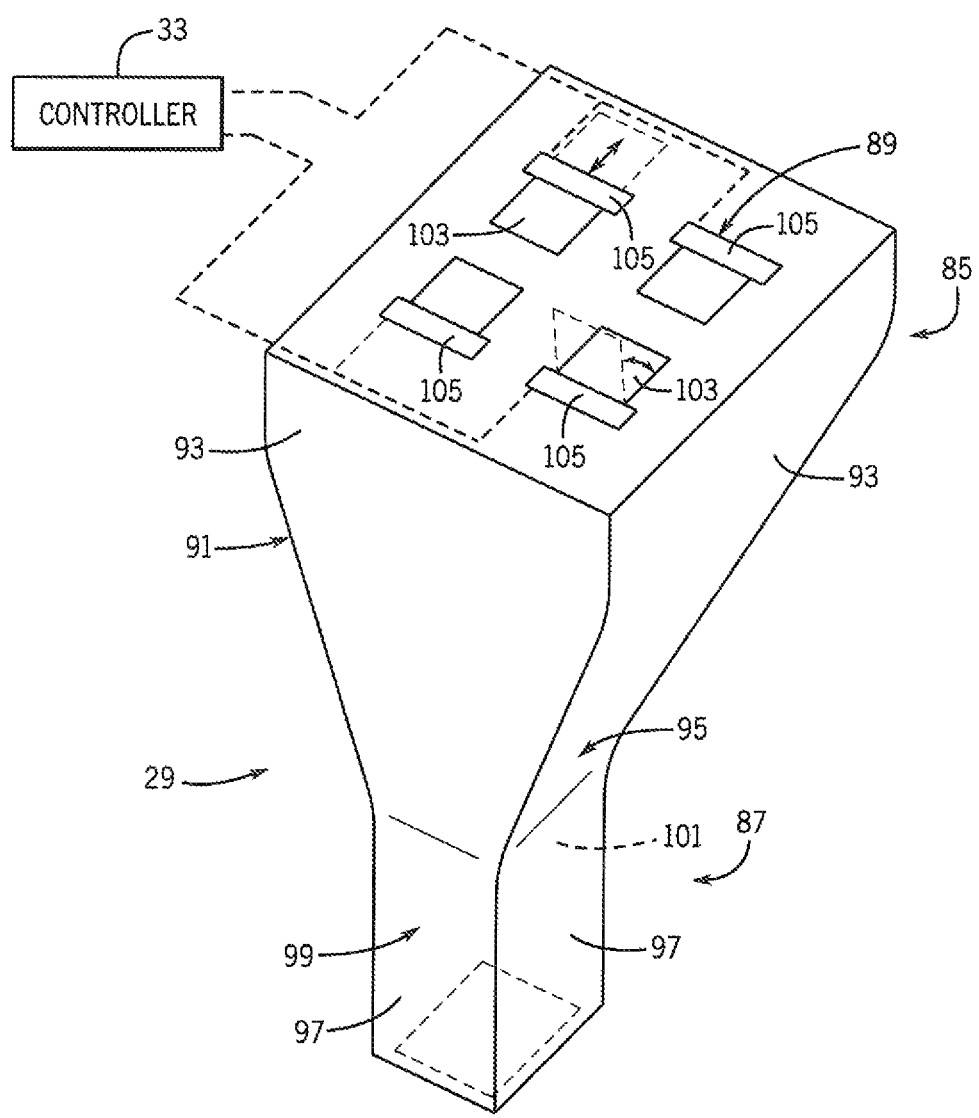
FIG. 6 is a pictorial view of a selector assembly of FIG. 4.

Referring now to FIG. 6, the inlet segment 85 has an inlet body 91 with interconnected walls 93 collectively defining a tube for guiding the seed type(s) 21a, 21b, 21c, 21d in a longitudinal direction from the on-row hopper(s) 49, 57, 71 (FIGS. 1-3) toward the outlet segment 87 of the selector assembly 29. The outlet segment 87 has an outlet body 95 with interconnected walls 97 collectively defining an outlet duct 99 that may provide a tube for guiding the seed type(s) 21a, 21b, 21c, 21d in a longitudinal direction from the inlet segment 85 of the selector assembly 29 toward the seed meter inlet 77 (FIG. 4). In this way, a passage 101 is defined longitudinally through the selector assembly 29 through the arrangement of the inlet and outlet segments 85, 87. Flow of the seed type(s) 21a, 21b, 21c, 21d through the passage 101 is selectively permitted and/or prevented by the valve system 89. As shown in this embodiment, the valve system 89 can be arranged at the inlet segment 85 of the selector assembly 29 or can be adjacent, connected to, or integrally incorporated into the bottom wall 83 of the on-row hopper(s) 49, 57, 71 (FIGS. 1-3).

Still referring to FIG. 6, the selector assembly 29 includes at least one selector valve 103, shown here with four selector valves 103, that are actuatable for selectively blocking and/or permitting flow of seeds 21 through compartment outlets 81 (FIG. 4) to switch which of the multiple seed types 21a, 21b, 21c, 21d are delivered to the seed chamber 75 of the seed meter 27 at a given time. Referring now to FIG. 4, the selector valve(s) 103 can be arranged closer to the outlets 81 of the on-row storage system 31 than the inlet 77 of the seed meter housing 73, whereby switching of which seed types 21a, 21b, 21c, 21d is released to be fed to the seed meter 27 is done upstream of and spaced from the seed meter inlet 77. Referring again to FIG. 6, an actuator 105 is arranged to move for each of the selector valves 103 to provide selective flow control of the corresponding seed type 21a, 21b, 21c, 21d for selectively feeding the seed meter 27. The selector valves 103 and actuators 105 can provide an arrangement in which the selector valves 103 are linear actuated gates such as that shown toward the top of the valve system 89 of FIG. 6. Or, the selector valves 103 and actuators 105 can provide an arrangement in which the selector valves 103 are pivoted hinge type or rotationally driven gates such as that shown toward the bottom of the valve system 89 of FIG. 6 as represented by the selector valve 103 shown in dashed-outline corresponding to an open position in which the dashed-outline selector valve 103 extends upwardly at an angle relative to a top wall of the selector assembly 29. Regardless of the particular movement paths of the selector valves 103, the actuators 105 can be any of a variety of electronic, electro-mechanical, pneumatic, and hydraulic, actuators which allow the actuators 105 to be driven electronically, hydraulically, pneumatically, by way of friction to allow seeds 21 to be selectively released by type 21*a*, 21*b*, 21*c*, 21*d* from the on-row storage system 31 to the seed meter 27.

Referring again to FIGS. 1-3, the on-row storage system 31 can store all of the seed 21 in on-row bulk storage as shown in FIG. 1, can receive all of the seed 21 from remote or central bulk storage as shown in FIG. 2, or can both store seed 21 on-row in bulk and receive seed 21 from remote or central bulk storage as shown in FIG. 3. Referring again to FIGS. 2 and 4, for embodiments with multiple bulk-receiving compartments 53 that pneumatically receive the seed types 21*a*, 21*b*, 21*c*, 21*d* from the bulk-storing compartments 25 of the centrally located bulk fill hoppers 33, a seed gate system 107 is configured for maintaining fill levels of seed 21 in the bulk-receiving compartments 53 to and ensure that each bulk-receiving compartment 53 has enough of its respective seed types 21*a*, 21*b*, 21*c*, 21*d* to allow the selector assembly 29 to release the seed types 21*a*, 21*b*, 21*c*, 21*d* into the seed meter 27 as controlled by the control system 33. Seed gate system 107 includes a seed gate 109 at each junction from which a bulk-receiving compartment feed tube 111 branches off from its respective secondary seed conduit 65. Each seed gate 109 is independently moved by an actuator 113 which may be electronic, pneumatic, or hydraulic actuators to direct seed 21 into a respective one(s) of the bulk-receiving compartment feed tube(s) 111 for filling the bulk-receiving compartments 53 of the segmented on-row mini-hopper 57. This is done by actuating the seed gate 109 between an open position and a closed position for permitting flow and blocking flow to the respective bulk-receiving compartment 53. Seed level sensors 115 are arranged in bulk-receiving compartments 53 to provide signals allowing the control system 33 to evaluate how much seed 21 of the seed types 21*a*, 21*b*, 21*c*, 21*d* is in each bulk-receiving compartment(s) 53 at each of the row units 13. In this way, control system 33 can use signals from the seed level sensors 115 to evaluate a current-state fill level of a particular seed type 21*a*, 21*b*, 21*c*, 21*d* relative to how much more seed 21 of that particular type 21*a*, 21*b*, 21*c*, 21*d* is needed at the corresponding row unit 15 to complete the planting of the current zone(s) VZ1, VZ2, VZ3, VZ4 (FIG. 7) along the travel path before reaching an approaching inter-zone boundary BND for that row unit 13.

Referring again to FIGS. 1-3 and 7, an operator first displays the seed type or variety prescription map PM (FIG. 7) on the computer display or monitor of the tractor interface system 47, which would typically be inside the tractor cab. The prescription map PM displays which type or variety zones VZ1, VZ2, VZ3, VZ4 are located where in the agricultural field and which seed types 21*a*, 21*b*, 21*c*, 21*d* can be planted in the variety zones VZ1, VZ2, VZ3, VZ4. As shown in FIG. 7, in this embodiment, seed type 21*a* is shown as acceptable for use in variety zone VZ1, corresponding to a recommended type A. Seed type 21*b* is shown as acceptable for use in variety zone VZ2, corresponding to a recommended type B. Seed type 21*c* is shown as acceptable for use in variety zone VZ3, corresponding to a recommended type C. Seed type 21*d* is shown as acceptable for use in variety zone VZ4, corresponding to a recommended type D.

Through the tractor interface system 47, the operator inputs seed type storage information such as which seed types 21*a*, 21*b*, 21*c*, 21*d* are stored in the bulk-storing compartments 25 of the bulk on-row hopper(s) 49 of the on-row storage system 31 (FIG. 1), the bulk-storing compartments 25 of the centrally located bulk fill hoppers 49, and the corresponding bulk-receiving compartments 53 at each row unit 13 (FIG. 2), or for combined central and on-row bulk storage, the bulk-storing compartment(s) 25 as provided in the centrally located bulk fill hopper(s) 49, its corresponding bulk-receiving compartment(s) 53 and also the bulk-storing compartments 25 within combined on-row hoppers 71 (FIG. 3). The prescription map PM may also contain the seed population that is to be planted for each type or variety 21*a*, 21*b*, 21*c*, 21*d*. The seed population could also be varied within the field based on soil type, organic matter, etc. The size of the seeds can also be input into the tractor interface system 47. This information could also be made available in the database that is built from the desktop software when the prescription map PM was created. The operator also inputs travel path information, such as by selecting or (re)defining an intended planting strategy travel path through the field while planting through the tractor interface system 47. The control system 33 used this inputted information to control the timing of switchover events so that changeovers of different seed types 21*a*, 21*b*, 21*c*, 21*d* occur substantially when the seed meter(s) 27 crosses the boundary BND between zones VZ1, VZ2, VZ3, VZ4.

Still referring to FIGS. 1-3 and 7, when the control system 33 determines from the prescription map PM that a switch should be made, control system 33 commands selector assembly 29 to change from releasing one of the seed types 21*a*, 21*b*, 21*c*, 21*d* to a different one of the seed types 21*a*, 21*b*, 21*c*, 21*d*, corresponding to the seed type 21*a*, 21*b*, 21*c*, 21*d* that should be planted in the approaching zone VZ1, VZ2, VZ3, VZ4. Referring now to FIGS. 1-3 and 6, the control system 33 can command the actuator 105 of the currently opened selector valve 103 to close its selector valve 103, blocking further flow of the currently planted seed type(s) 21*a*, 21*b*, 21*c*, 21*d* from the corresponding compartment outlet(s) 81 (FIG. 4). At the same time, the control system 33 can command the actuator 105 of the next needed selector valve 103 to open its selector valve 103, permitting initial flow of the respective seed type 21*a*, 21*b*, 21*c*, 21*d* from the corresponding compartment outlet 81 (FIG. 4). When the control system 33 simultaneously commands closing the currently opened selector valve 103 of the to-be-ending seed type and opening the next needed selector valve 103 of the next-needed seed type, for a short amount of time, there will be a mixture of both the to-be-ending seed type and next-needed seed type in the seed reservoir 75 of the seed meter 27. When this occurs, for a short amount of time, the seed meter 27 will plant a mixture of the to-be-ending and next-needed seed types onto the field. This may define a transitional mixture zone TMZ straddling the boundary BND zone VZ1, VZ2, VZ3, VZ4, the size of which is influenced by the amount of time delay between closing the currently opened selector valve of the to-be-ending seed type opening the next needed selector valve 103 of the next-needed seed type. The longer the delay, the smaller the volume of the mixed to-be-ending and next-needed seed types will collect in the seed reservoir 75 of the seed meter 27 (FIG. 4), providing a smaller or shorter transitional mixture zone TMZ, with less mixed planting during the switchover. That is because relatively few receipts of the to-be-ending type will be in the seed reservoir 75 of the seed meter 27 (FIG. 4) when the selector assembly 29 begins releasing seeds of the next-needed type into the seed reservoir 75 when the control system 33 commands such a relatively longer delay. The shorter the delay, the greater the volume of the mixed to-be-ending and next-needed seed types will collect the seed reservoir 75 of the seed meter 27 (FIG. 4), providing a larger or longer transitional mixture zone TMZ, with more mixed planting during the switchover.

Many changes and modifications could be made to the invention without departing from the spirit thereof. Various components and features of the system 5, for example, components or features of the seed storage system(s), charging system(s), and seed metering system(s) can be incorporated alone or in different combinations on a planter or seeder. The scope of these changes will become apparent from the appended claims.

We claim:

1. A planter for planting multiple types of seed in a single planting pass during row-crop planting of an agricultural field, the planter comprising:
   a frame;
   a bulk storage system for separately storing seeds of multiple types on the planter;
   multiple row units supported by the frame, each of the multiple row units including,
      an on-row storage system with multiple compartments configured to store the multiple types of seed;
      a seed meter for planting the multiple types of seed and including a housing defining a seed chamber therein for receiving seeds for singulation and individual delivery from the seed meter, the housing of the seed meter having an inlet defining a passage from outside of the seed meter to the seed chamber;
      a flow path at least partially interconnecting the bulk storage system and the on-row storage system for selectively carrying a selected one of the multiple types of seeds from the bulk storage system toward the on-row storage system;
      a diverter in communication with the flow path for selectively diverting the selective one of the multiple types of seeds in the flow path to a corresponding compartment of the on-row storage system; and
      a selector assembly arranged between the multiple compartments of the on-row storage system and the inlet of the seed meter housing for selectively releasing seeds of one of the multiple types of seed from a corresponding one of the multiple compartments of the on-row storage system into the seed chamber of the seed meter at a given time.

2. The planter of claim 1 wherein the multiple compartments of the on-row storage system include compartment outlets, and the selector assembly includes an inlet segment arranged for receiving seeds from the compartment outlets.

3. The planter of claim 2 wherein the selector assembly includes at least one selector valve actuatable for selectively blocking flow of seeds through ones of the compartment outlets and permitting flow of seeds through ones of the compartment outlets to switch which of the multiple seed types are delivered to the seed chamber of the seed meter.

4. The planter of claim 2 wherein the selector assembly includes a valve system selectively blocking flow and permitting flow of seeds of the multiple types through the selector assembly for allowing delivery of seeds of a single one of the multiple types out of the selector assembly at a given time.

5. The planter of claim 4 wherein the valve system includes at least one selector valve configured to unblock and permit flow of seeds through a single one of the compartment outlets of the on-row storage system and to block and prevent flow of seeds through the remaining compartment outlets of the on-row storage system while the selector assembly is directing seeds from the on-row storage system to the inlet of the seed meter housing.

6. The planter of claim 5 wherein the at least one selector valve includes at least one of a linear actuated gate and a rotationally activated gate.

7. The planter of claim 5 wherein the at least one selector valve is arranged closer to the outlets of the on-row storage system than the inlet of the seed meter housing.

8. The planter of claim 2 wherein the selector assembly includes an outlet segment arranged between the inlet segment of the selector assembly and the inlet of the seed meter housing for directing seeds from the selector assembly to the inlet of the seed meter housing.

9. The planter of claim 8 wherein the outlet segment of the selector assembly comprises an outlet duct interconnecting the selector assembly with the inlet of the seed meter housing and defining a passage extending in a longitudinal direction relative to the outlet segment of the selector assembly for directing the seeds from the selector assembly to the inlet of the seed meter housing.

10. The planter of claim 2 wherein the multiple compartments are defined in a hopper supported by the row unit and having a bottom wall, wherein the compartment outlets are defined at the bottom wall of the hopper, and wherein the inlet segment of the selector assembly is connected to the bottom wall of the hopper to receive seeds from the compartment outlets at the bottom wall.

11. The planter of claim 2 wherein the multiple compartments are defined in a bulk storage hopper supported by the row unit and configured for gravity feeding the seeds of the multiple types from the multiple compartments into the inlet of the seed meter housing.

12. The planter of claim 2 wherein the multiple compartments are defined in a mini-hopper supported by the row unit and configured to pneumatically receive seeds of the multiple types from the bulk storage system of planter.

13. A planter for planting multiple types of seed in a single planting pass during row-crop planting of an agricultural field, the planter comprising:
   a bulk storage system for separately storing seeds of multiple types on the planter;
   a frame and multiple row units supported by the frame, each of the multiple row units including,
      multiple compartments supported at each row unit storing multiple types of seed;
      a seed meter for separately planting the multiple types of seed at separate zones of an agricultural field, wherein each of the zones corresponds to a characteristic of the agricultural field relating to at least one of soil type and management type;
      a flow path at least partially interconnecting the bulk storage system and the multiple compartments of a row unit for selectively carrying a selected one of the multiple types of seeds from the bulk storage system toward the row unit;

a diverter in communication with the flow path for selectively diverting the selective one of the multiple types of seeds in the flow path to a corresponding compartment of the row unit; and a selector assembly extending between the multiple compartments and the seed meter for selectively releasing a first seed type of the multiple types of seed from a corresponding first one of the multiple compartments into the seed meter for release onto a first zone of the agricultural field and selectively releasing a second seed type of the multiple types of seed from a corresponding second one of the multiple compartments into the seed meter for release onto a second zone of the agricultural field.

14. The planter of claim 13 wherein the selector assembly includes at least one selector valve actuatable for selectively blocking flow of seeds through the outlets of the multiple compartments to selectively permit the flow of seeds from the multiple compartments for delivery to the seed meter.

15. The planter of claim 14, wherein the seed meter includes an inlet providing a passage for seeds to flow into the seed meter and the selector assembly includes an outlet duct arranged between the at least one selector valve and the seed meter inlet for receiving seeds of the first or second type permitted to flow past the at least one selector valve and directing the seeds of the first or second type permitted to flow past at least one selector valve from the at least one selector valve to the inlet of the seed meter.

16. A planter for planting multiple types of seed in a single planting pass during row-crop planting of an agricultural field, the planter comprising:

a frame supporting multiple row units;

a bulk storage system for separately storing seeds of multiple types on the planter;

multiple compartments at each of the multiple row units configured to store the multiple types of seed;

a flow path at least partially interconnecting the bulk storage system and the multiple compartments of a row unit for selectively carrying a selected one of the multiple types of seeds from the bulk storage system toward the row unit;

a diverter in communication with the flow path for selectively diverting the selective one of the multiple types of seeds in the flow path to a corresponding compartment of the row unit;

a seed meter at each of the multiple row units for planting the multiple types of seed and including a housing defining a seed chamber therein for receiving seeds for singulation and individual delivery from the seed meter, the housing of the seed meter having an inlet defining a passage for directing seed into the seed chamber, and a selector assembly at each of the multiple row units arranged between the multiple compartments and the inlet of the seed meter housing for selectively releasing seeds of one of the multiple types of seed from a corresponding one of the multiple compartments of the on-row storage system into the seed chamber of the seed meter at a given time; and a control system operably connected to each selector assembly and configured to control which seed type of the multiple seed types is released onto an agricultural field based on a location of the planter with respect to multiple zones of an agricultural field, wherein each of the multiple zones corresponds to a characteristic of the agricultural field relating to at least one of soil type and management type, and wherein the control system commands actuation of the selector assembly switching from delivering seeds of a first type of the multiple types from a first compartment of the multiple compartments past the selector assembly and into the seed chamber of the seed meter when the planter is in a first zone of the multiple zones to delivering seeds of a second type of the multiple types from a second compartment of the multiple compartments past the selector assembly and into the seed chamber of the seed meter when the planter is in a second zone of the multiple zones.

17. The planter of claim 16 wherein the multiple compartments at each of the multiple row units have respective outlets and wherein the selector assembly includes at least one selector valve arranged relatively closer to the outlets of the multiple compartments than the inlet of the seed meter housing.

18. The planter of claim 17 wherein the selector assembly includes an outlet segment arranged between the at least one selector valve and the inlet of the seed meter housing for directing seeds from the selector assembly to the inlet of the seed meter housing.

* * * * *